United States Patent
Shim et al.

(10) Patent No.: US 11,558,806 B2
(45) Date of Patent: Jan. 17, 2023

(54) APPARATUS AND METHOD FOR CONTROLLING A TERMINAL ACCESSING A BASE STATION IN BROADBAND WIRELESS COMMUNICATION SYSTEM

(71) Applicant: Samsung Electronics Co., Ltd., Suwon-si (KR)

(72) Inventors: Jae-Jeong Shim, Seongnam-si (KR); Won-Il Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 17/321,978

(22) Filed: May 17, 2021

(65) Prior Publication Data

US 2021/0274427 A1    Sep. 2, 2021

Related U.S. Application Data

(63) Continuation of application No. 16/552,485, filed on Aug. 27, 2019, now Pat. No. 11,012,918, which is a continuation of application No. 15/974,361, filed on May 8, 2018, now Pat. No. 10,506,495, which is a continuation of application No. 12/326,376, filed on Dec. 2, 2008, now Pat. No. 9,986,488.

(30) Foreign Application Priority Data

Dec. 11, 2007   (KR) .................. 10-2007-0128178

(51) Int. Cl.
*H04W 48/02*   (2009.01)
*H04W 36/00*   (2009.01)
*H04W 36/24*   (2009.01)

(52) U.S. Cl.
CPC ..... *H04W 48/02* (2013.01); *H04W 36/00835* (2018.08); *H04W 36/0083* (2013.01); *H04W 36/0085* (2018.08); *H04W 36/24* (2013.01)

(58) Field of Classification Search
CPC ................. H04W 48/02; H04W 36/24; H04W 36/00835

See application file for complete search history.

(56) References Cited

U.S. PATENT DOCUMENTS 11,012,918 B2 *  5/2021  Shim ............... H04W 36/00835
2002/0082032 A1  6/2002  Hunzinger
(Continued)

FOREIGN PATENT DOCUMENTS

CA   2651868 A1   11/2007
CN   1464754 A    12/2003
(Continued)

OTHER PUBLICATIONS

Tzik Shahar, Figure for SS CDMA Initial Ranging, IEEE 802.16. Broadband Wireless Access Working Group, Jun. 15, 2006.
(Continued)

*Primary Examiner* — Myron Wyche
(74) *Attorney, Agent, or Firm* — Jefferson IP Law, LLP

(57) ABSTRACT

A circuit includes a controller to determine whether to prohibit entry of an end unit to a base station in a wireless communication network, the controller configured to process a media access control (MAC) management message that includes a timer value, the timer value designating a time period during which entry is prohibited.

20 Claims, 6 Drawing Sheets

(56) References Cited

U.S. PATENT DOCUMENTS

| | | |
|---|---|---|
| 2004/0174845 A1 | 9/2004 | Koo et al. |
| 2005/0181794 A1 | 8/2005 | Rajkotia |
| 2007/0010251 A1 | 1/2007 | Cho et al. |
| 2007/0015510 A1 | 1/2007 | Xiang |
| 2007/0076684 A1 | 4/2007 | Lee et al. |
| 2007/0124443 A1 | 5/2007 | Nanda et al. |
| 2007/0291698 A1 | 12/2007 | Lee et al. |
| 2008/0043699 A1 | 2/2008 | Park et al. |
| 2008/0102842 A1 | 5/2008 | Kim |
| 2009/0029712 A1 | 1/2009 | Marjelund et al. |
| 2009/0043699 A1 | 2/2009 | Elterich |
| 2009/0067346 A1 | 3/2009 | Sung |
| 2009/0323634 A1 | 12/2009 | Kim et al. |
| 2011/0009158 A1 | 1/2011 | Lee et al. |

FOREIGN PATENT DOCUMENTS

| | | |
|---|---|---|
| CN | 1698390 A | 11/2005 |
| CN | 101032097 A | 9/2007 |
| DE | 197 34 288 A1 | 2/1999 |
| JP | 2003520537 A | 7/2003 |
| KR | 10-2005-0040688 A | 5/2005 |
| KR | 20060010264 A | 2/2006 |
| KR | 10-2007-0006653 A | 1/2007 |
| KR | 10-0730561 B1 | 6/2007 |
| KR | 10-0737350 B1 | 7/2007 |
| RU | 2 286 649 C2 | 1/2002 |
| WO | 2004/079948 A1 | 9/2004 |
| WO | 2006011753 A1 | 2/2006 |
| WO | 2006014128 A1 | 2/2006 |
| WO | 2006080676 A1 | 8/2006 |
| WO | 2007006228 A1 | 1/2007 |
| WO | 2007/037633 A1 | 4/2007 |
| WO | 2007040449 A1 | 4/2007 |
| WO | 2007/133034 A2 | 11/2007 |

OTHER PUBLICATIONS

IEEE-SA, Part 16: Air Interface for Broadband Wireless Access Systems; P80216Rev2_D1, IEEE Draft, Oct. 3, 2007, pp. 1-1897, Piscataway, NJ, USA.

Chinese Office Action dated Nov. 6, 2018, issued in the Chinese Patent Application No. 201510387769.8.

Malaysian Substantive Examination Clear Report dated Oct. 31, 2018, issued in the Malaysian Patent Application No. PI 20093672.

Chinese Office Action dated Apr. 9, 2019, issued in the Chinese Patent Application No. 201510387769.8.

European Summons to attend oral proceedings dated Apr. 29, 2019, issued in the European Application No. 08170704.4.

Croatian Office Action dated Apr. 29, 2019, issued in the Croatian Application No. P20090686A.

Malaysian Substantive Examination Adverse Report dated Jul. 31, 2019, issued in the Malaysian Patent Application No. PI 2012004800.

European Office Action dated Jun. 14, 2018, issued in the European Application No. 08 170 704.4 and Chinese Office Action dated Jul. 25, 2018, issued in the Chinese Application No. 201510387769.8.

Croatian Office Action dated Sep. 9, 2019, issued in Croatian Application No. P20090686A.

Malaysian Substantive Examination Clear Report dated Apr. 22, 2020, issued in Malaysian Patent Application No. PI 2012004800.

Chinese Reexamination Notification dated Apr. 30, 2020, issued in Chinese Patent Application No. 201510387769.8.

Chinese Decision of Reexamination dated Sep. 29, 2020, issued in Chinese Patent Application No. 201510387769.8.

* cited by examiner

APPARATUS AND METHOD FOR CONTROLLING A TERMINAL ACCESSING A BASE STATION IN BROADBAND WIRELESS COMMUNICATION SYSTEM

CROSS-REFERENCE TO RELATED APPLICATION(S)

This application is a continuation application of prior application Ser. No. 16/552,485, filed on Aug. 27, 2019, which is a continuation application of prior application Ser. No. 15/974,361, filed on May 8, 2018, which has issued as U.S. Pat. No. 10,506,495 on Dec. 10, 2019, which is a continuation application of prior application Ser. No. 12/326,376, filed on Dec. 2, 2008, which has issued as U.S. Pat. No. 9,986,488 on May 29, 2018 and was based on and claimed priority under 35 U.S.C § 119(a) of a Korean patent application number 10-2007-0128178, filed on Dec. 11, 2007, in the Korean Intellectual Property Office, the disclosure of which is incorporated by reference herein in its entirety.

BACKGROUND OF THE INVENTION

Field of the Invention

The present invention relates to a broadband wireless communication system, and in particular, to an apparatus and a method for controlling a terminal accessing a base station in a broadband wireless communication system.

Description of the Related Art

In a 4th generation (4G) communication system, research for providing services having various Quality of Service (QoS) using transmission speeds of about 100 Mbps is in active progress. Particularly, research for supporting high speed services in the form of guaranteeing mobility and QoS for a broadband wireless access (WBA) communication system, such as short-distance wireless communication network system and wireless metropolitan area network (WMAN) system, is in active progress. As an example, communication systems complying with the Institute of Electrical and Electronics Engineers (IEEE) 802.16 specification is representative of such a system.

The IEEE 802.16 system standard defines various procedures, such as the operation of a Media Access Control (MAC) layer. Examples of MAC layer procedures include an initial ranging procedure and a handover procedure. Described below are procedures for initial ranging and handover initiated by a terminal in accordance with the IEEE 802.16 system standard.

The initial ranging procedure according to the IEEE 802.16 system standard is performed as follows. To initiate initial ranging, a terminal transmits one of a plurality of prescribed ranging codes to a base station. In response thereto, the base station transmits a response message RaNGing ReSPonse (RNG_RSP) message to the terminal. The RNG_RSP message includes ranging status Type-LengthValue (TLV). If the base station is in a status that does not allow ranging of the terminal (i.e., the entry of the terminal to the base station), the base station sets the ranging status TLV to "abort" to inform the terminal of a ranging-not-allowed status. Accordingly, the terminal detects when its request for entry is not allowed and then scans other base stations for entry.

The handover procedure according to the IEEE 802.16 system standard is performed as follows. To initiate handover, a terminal scans neighboring base stations and transmits information of scanned neighboring base stations MOBile Mobile Station HandOver-REQuest (MOB_MSHO-REQ) message that includes information of target base station candidates to its serving base station. Accordingly, the serving base station confirms whether the target base station candidates included in the MOB_MSHO-REQ message received from the terminal can support service for the terminal. At this point, the serving base station transmits a MOBile_Base Station HandOver-ReSPonse (MOB_BSHO-RSP) message indicating that a target base station has been found to the terminal. The MOB BSHO-RSP message includes information of the target base station candidates that can provide the requested handover. The terminal that has received the MOB_BSHO-RSP message selects a target base station and transmits a MOBile HandOver-INDication (MOB_HO-IND) message to inform the serving base station of the selected target base station. The serving base station that has confirmed the target base station selected by the terminal provides information regarding the terminal to the target base station, and the terminal performs an entry procedure to connect to the target base station.

As described above, the base station can limit entry of the terminal during the initial ranging procedure. However, the base station cannot prevent the terminal from immediately trying to access the base station again, that is, retrying the initial ranging procedure. When the terminal immediately re-requests the base station for entry, there is a high possibility that the entry request will be denied again since the status of the base station has not yet changed. Therefore, immediately requesting entry again by the terminal causes waste of wireless resources. In addition, a terminal that has performed handover to change the serving base station may initiate handover again to the previous serving base station. Repeatedly performing handover between two base stations also causes waste of wireless resources, and repeatedly attempting handover itself wastes wireless resources. Therefore, there is a need to prevent unnecessary attempts for entry as well as actual execution of entry procedures.

SUMMARY OF THE INVENTION

An object of the present invention is to provide an apparatus and a method to prevent unnecessary attempts for entry and access of a network in a broadband wireless communication system.

Another object of the present invention is to provide an apparatus and a method to prohibit a terminal from attempting re-entry to a specific base station in a broadband wireless communication system.

Still another object of the present invention is to provide an apparatus and a method for informing an entry prohibition time of a specific terminal with respect to a specific base station in a broadband wireless communication system.

According to an aspect of the present invention, a base station apparatus in a broadband wireless communication system includes a controller to determine whether to prohibit an entry attempt of a terminal, a generator to generate a media access control (MAC) management message including a value of a timer, the value representing prohibition of entry attempt, and a transmitter to transmit the MAC management message to the terminal.

According to another aspect of the present invention, a terminal apparatus in a broadband wireless communication system includes a receiver to receive a media access control (MAC) management message from a base station, a reader to confirm existence of a value of a timer included in the MAC management message, the value representing prohibition of entry attempt, and a controller to designate the base station as prohibited for entry attempt until expiration of the timer.

According to still another aspect of the present invention, a method for operating a base station in a broadband wireless communication system includes determining whether to prohibit an entry attempt of a terminal, generating a media access control (MAC) management message including a value of a timer, the value representing prohibition of entry attempt, and transmitting the MAC management message to the terminal.

According to yet another aspect of the present invention, a method for operating a terminal in a broadband wireless communication system includes receiving a media access control (MAC) management message from a base station, confirming existence of a value of a timer included in the MAC management message, the value representing prohibition of entry attempt, and designating the base station as being prohibited from entry attempt until expiration of the timer.

According to yet another aspect of the present invention, a circuit includes a controller to determine whether to prohibit entry of an end unit to a base station in a wireless communication network, the controller configured to process a media access control (MAC) management message that includes a timer value, the timer value designating a time period during which entry is prohibited.

According to yet another aspect of the present invention, a method includes determining whether to prohibit entry of an end unit to a base station in a wireless communication network and processing a media access control (MAC) management message that includes a timer value, the timer value designating a time period during which entry is prohibited.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE EMBODIMENTS

Embodiments of the present invention will be described herein below with reference to the accompanying drawings.

Exemplary embodiments of the present invention provide a system and method to prevent unnecessary attempts for entry and access to a base station by a terminal in a broadband wireless communication system. For purposes of example, the exemplary embodiments of the present invention are illustrated in conjunction with a wireless communication system using an orthogonal frequency division multiple access (OFDMA) scheme. However, it is to be understood that the present invention may be implemented on wireless communication systems using other schemes without departing from the scope of the present invention.

To limit attempts of entry by a terminal, the present invention defines a TypeLengthValue (TLV) for exchanging entry limit timer information as illustrated in Table 1. The TLV defined by the present invention may be included in various MAC management messages, such as RaNGing-ReSPonse (RNG-RSP) messages, Base Station HandOver-REQuest (BSHO-REQ) messages, and Base Station HandOver-ReSPonse (BSHO-RSP) messages. However, it is to be understood that the entry limit timer TLV of the present invention may be included in other messages without departing from the scope of the present invention.

TABLE 1

| Type | Length | Value | Scope |
|------|--------|-------|-------|
| Xx | 1 | 0-255: In units of 100 milliseconds | RNG-RSP BSHO-REQ BSHO-RSP |

As illustrated in Table 1, a TLV for limiting entry of a terminal according to the present invention represents a timer value. In an exemplary embodiment, the length of the TLV is 1 byte, and the value thereof expresses entry limit time in units of 100 milliseconds. When the value is 0, it means that an entry limit time is infinite. However, it is to be understood that other data lengths and units of time represented by its value may be used without departing from the scope of the present invention. For convenience in explanation, the present invention calls the TLV on Table 1 an "entry limit timer TLV"

Figure 1:
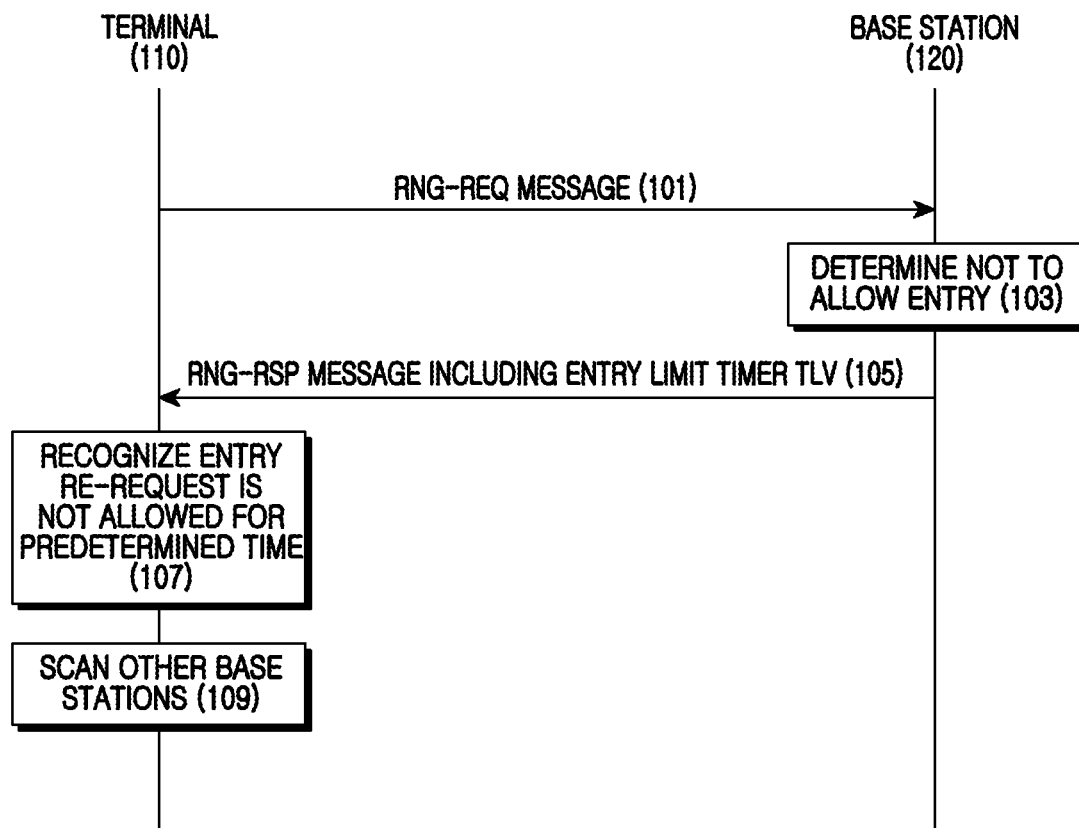
FIG. 1 is a view illustrating an example of signal exchange during an initial ranging procedure in a broadband wireless communication system according to the present invention.

FIG. 1 illustrates an example of signal exchange during an initial ranging procedure between a terminal and a base station in a broadband wireless communication system according to an exemplary embodiment of the present invention.

As shown in FIG. 1, a terminal 110 transmits a ranging request message (e.g., RNG-REQ) to a base station 120 in order to enter a network (step 101). The base station 120 that has received the ranging request message (e.g., RNG-REQ) recognizes that the terminal 110 desires to access the base station 120 and determines whether to allow entry of the terminal 110. Based on the result of the determination step, the base station 120 may decide that entry to the base station 120 cannot be allowed (step 103). For example, the base station 120 may determine that the entry of the terminal 110 cannot be allowed due to reasons such as resource shortage, service unavailable, etc.

In such a situation, the base station 120 transmits a ranging response message (e.g., RNG-RSP) that includes an entry limit timer TLV to the terminal 110 (step 105). That is, the base station 120 transmits the ranging response message (e.g., RNG-RSP) including ranging status TLV (e.g., ranging status TLV set to "abort") to inform the terminal of the denial of entry to the base station 120 and an entry limit timer TLV to inform the terminal of the prohibition of entry to the base station 120 for a predetermined time. Here, the entry limit timer TLV includes time information prohibiting the entry. At this point, the base station may also incorporate downlink frequency override TLV into the ranging response message (e.g., RNG_RSP). The downlink frequency override TLV includes frequency allocation (FA) information recommended to a terminal designed to induce the terminal to make an entry request through a different frequency.

The terminal 110 that has received the ranging response message (e.g., RNG-RSP) including the ranging status TLV and the entry limit timer TLV recognizes that an entry request by the terminal 110 has been rejected, and simultaneously, confirms the entry limit timer TLV to recognize that attempts of entry to the base station 120 is prohibited for the predetermined time (step 107).

Accordingly, the terminal 110 does not try entry to the base station 120 for the predetermined time but rather scans other accessible base stations (step 109). Further, if the ranging response message (e.g., RNG-RSP) includes the downlink frequency override TLV, the terminal 110 scans for accessible base stations at the different FA designated by the downlink frequency override TLV. If, on the other hand, the ranging response message (e.g., RNG-RSP) does not include the downlink frequency override TLV, the terminal 110 scans for accessible base stations at the same FA.

After the scanning step 109, the terminal 110 performs a network entry procedure again. At this point, even though the base station 120 is determined to be the most appropriate base station to connect to, i.e., has the best channel status, the terminal 110 does not try entry to the base station 120 while the predetermined time confirmed in step 107 has not expired.

Figure 2:
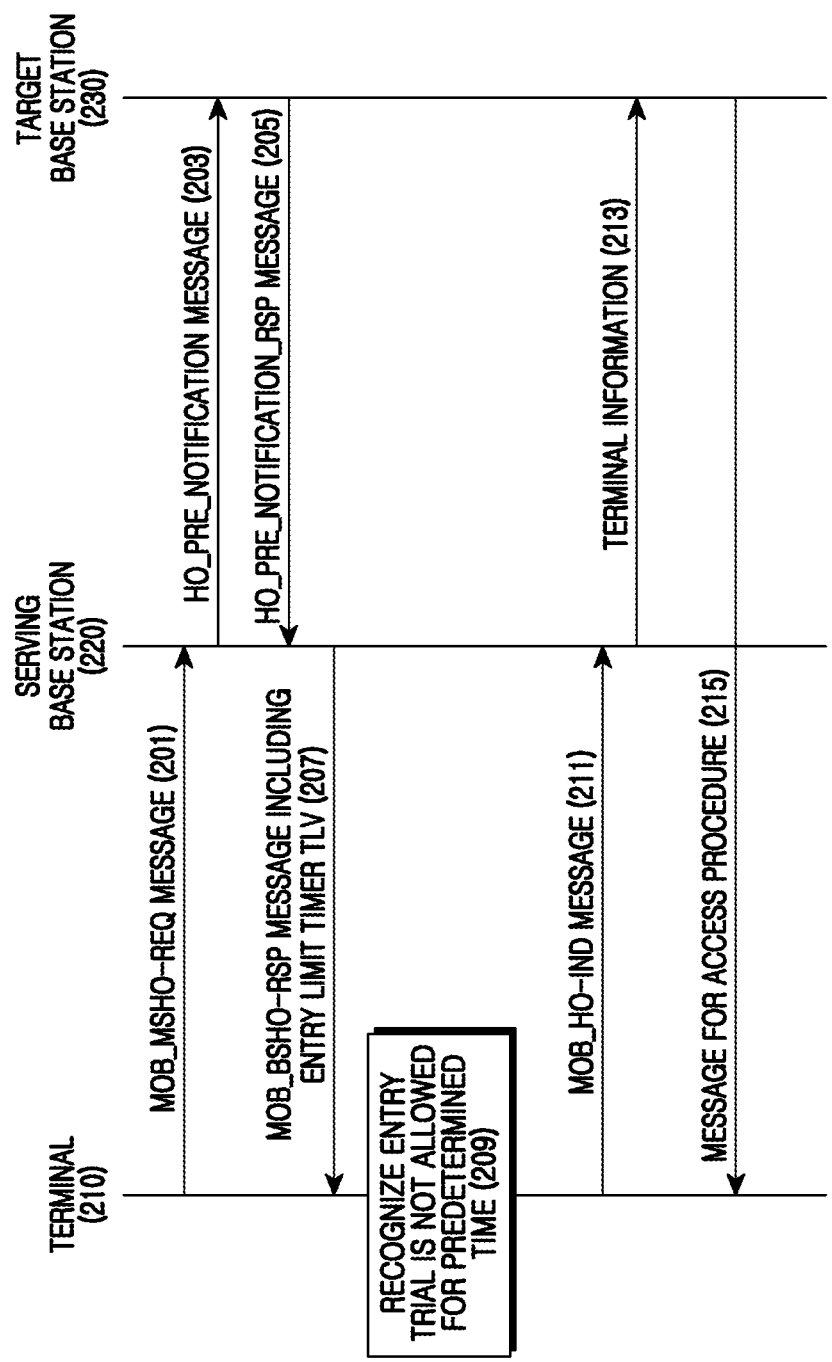
FIG. 2 is a view illustrating an example of signal exchange during a handover procedure in a broadband wireless communication system according to the present invention.

FIG. 2 illustrates an example of signal exchange during a handover procedure between a terminal and a base station in a broadband wireless communication system according to an exemplary embodiment of the present invention.

As shown in FIG. 2, a terminal 210 transmits a handover request message (e.g., MOB_MSHO-REQ) to a serving base station 220 in order to switch (i.e., handover) to an adjacent base station (step 201). Here, the handover request message (e.g., MOB_MSHO-REQ) may include information of a target base station 230.

The serving base station 220 that has received the handover request message (e.g., MOB_MSHO-REQ) transmits a handover pre-notification message (e.g., HO pre notification) to the target base station 230 (step 203). The handover pre-notification message (e.g., HO_pre_notification) is a message for confirming whether the entry of the terminal 210 can be accepted. The target base station 230 that has received the handover pre-notification message (e.g., HO_pre_notification) determines whether the entry of the terminal 210 may be accepted and transmits a handover pre-notification response message (e.g., HO_pre_notification-RSP) informing the acceptance/denial of the handover request to the serving base station 220 (step 205).

If the handover request has been accepted by the target base station 230, the serving base station 220 that has received the handover pre-notification response message (e.g., HO_pre_notification-RSP) transmits a base station handover response message (e.g., MOB_BSHO-RSP) including an entry limit timer TLV to the terminal 210 (step 207). That is, the serving base station 220 transmits the base station handover response message (e.g., MOB_BSHO-RSP) to the terminal that includes information of the target base station 230 that has accepted the entry request of the terminal 210 and an entry limit timer TLV to inform the terminal of prohibition of entry to the serving base station 220 for a predetermined time.

The terminal 210 that has received the base station handover response message (e.g., MOB_BSHO-RSP) recognizes the target base station 230 that has accepted the entry request of the terminal 210 and simultaneously confirms the entry limit timer TLV to recognize that entry to the serving base station 220 is prohibited for the predetermined time (step 209). Thereafter, once the terminal 210 decides to initiate handover to the target base station 230, the terminal 210 transmits a handover indication message (e.g., MOB_HO-IND) to inform the serving base station 220 that handover to the target base station 230 is to be performed (step 211).

The serving base station 220 that has received the handover indication message (e.g., MOB_HO-IND) provides information of the terminal 210 to the target base station 230 (step 213). For example, the information of the terminal 210 may include information of service in use and ability information of the terminal 210. Once the target base station 230 receives the information of the terminal 210, the terminal 210 and the target base station 230 exchange access procedure messages and initiates access (step 215).

Once the process illustrated in FIG. 2 have been completed, the terminal 210 does not try entry to the serving base station 220 if the predetermined time confirmed in step 209 has not expired, even if the serving base station 220 has been considered for handover. In other words, when the predetermined time has not lapsed, the terminal 210 suspends handover to the serving base station 220. Though only one target base station is illustrated as a target base station candidate in FIG. 2 for convenience, a plurality of target base station candidates may exist.

Figure 3:
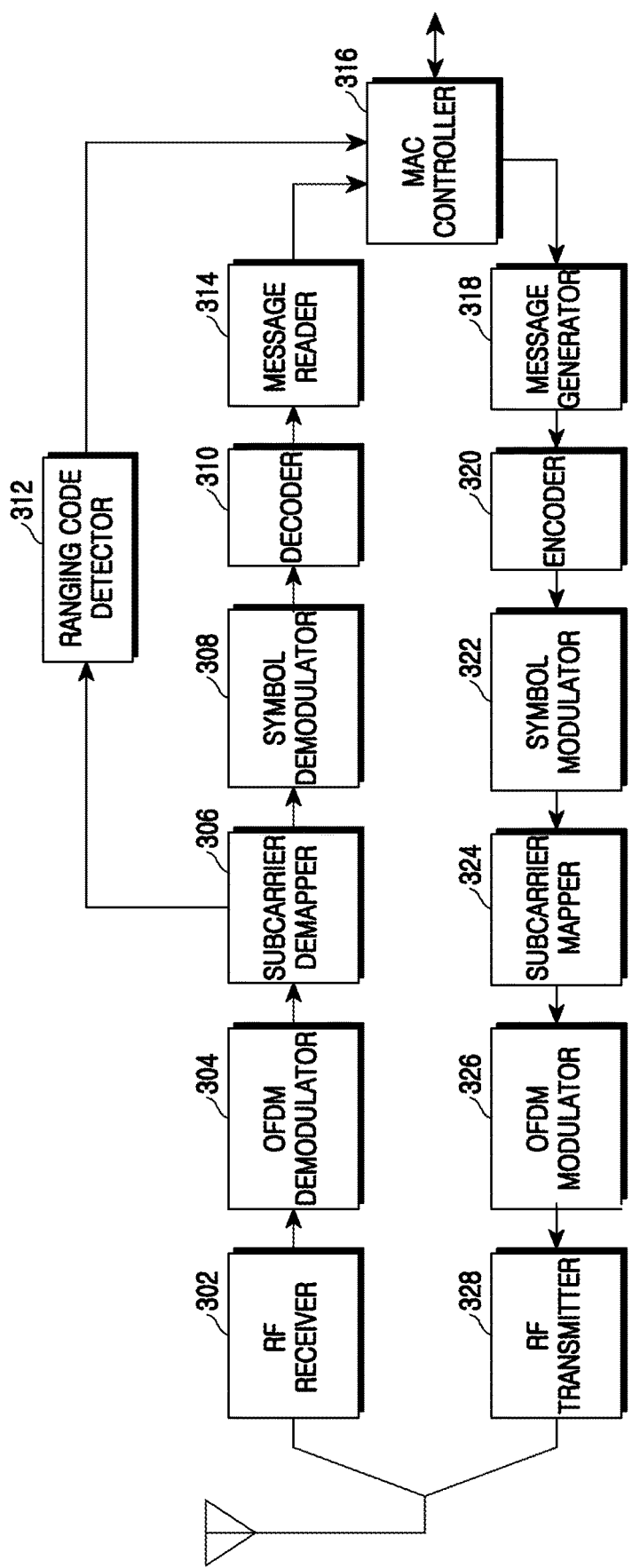
FIG. 3 is a block diagram illustrating a base station in a broadband wireless communication system according to an exemplary embodiment of the present invention.

FIG. 3 illustrates a block diagram of a base station in a broadband wireless communication system according to an exemplary embodiment of the present invention.

As shown in FIG. 3, the base station includes an RF receiver 302, an OFDM demodulator 304, a subcarrier demapper 306, a symbol demodulator 308, a decoder 310, a ranging code detector 312, a message reader 314, an MAC controller 316, a message generator 318, an encoder 320, a symbol modulator 322, a subcarrier mapper 324, an OFDM modulator 326, and an RF transmitter 328.

The RF receiver 302 down-converts a radio frequency (RF) signal received through an antenna into a baseband signal. The OFDM demodulator 304 classifies a signal provided by the RF receiver 302 on an OFDM symbol basis, removes a cyclic prefix (CP), and restores complex symbols mapped to a frequency domain through a fast Fourier transform (FFT) operation. The subcarrier demapper 306 extracts complex symbols mapped to the frequency domain on a process basis. For example, the subcarrier demapper 306 extracts signals mapped to a ranging subcarrier and provides the extracted signals to the ranging code detector 312. The symbol demodulator 308 demodulates complex symbols and converts the demodulated complex signals into a bit stream. The decoder 310 channel-decodes the bit stream to restore an information bit stream.

The ranging code detector 312 detects a ranging code transmitted by a terminal. That is, the ranging code detector 312 detects which ranging code has been transmitted by performing a correlation operation on signals mapped to a ranging subcarrier and ranging codes prescribed in advance.

The message reader 314 reads an MAC management message received from a terminal. For example, the message reader 314 reads a ranging request message (e.g., RNG-REQ) from a terminal for entry into a network to confirm the terminal intending to enter the network. Also, the message reader 314 confirms target base station candidates by reading a handover request message (e.g., MOB_MSHO-REQ) from a terminal and confirms a target base station to which information of the terminal should be provided by reading a handover indication message (e.g., MOB_HO-IND) that includes information of the target base station determined by the terminal.

The MAC controller 316 controls overall functions of the MAC layer of the base station. For example, when a terminal tries initial ranging, the MAC controller 316 determines whether to allow entry of the terminal on the basis of available wireless resources and available services, for example. Also, when a terminal requests handover, the MAC controller 316 confirms with a target base station as to whether the handover of the terminal is acceptable.

Particularly, in accordance with the present invention, the MAC controller 316 determines whether to prohibit entry attempts by the terminal. In this case, entry (i.e., access to a base station) may be by initial ranging or handover. For example, in the case where a terminal is denied entry to the base station through initial ranging, the MAC controller 316 prohibits the denied terminal from trying entry (i.e., initial ranging) to the base station for a predetermined time. In the case where a terminal performs handover to an adjacent base station, the MAC controller 316 prohibits the terminal performing the handover from trying entry (i.e., handover) to the base station for a predetermined time.

The message generator 318 generates an MAC management message to be transmitted to a terminal. For example, the message generator 318 generates a ranging response message (e.g., RNG-RSP), which is a response to an entry attempt by the terminal, a base station handover response message (e.g., MOB_BSHO-RSP), which is a response to a handover request from the terminal, and a base station handover request message (e.g., MOB-BSHO-REQ) to request the terminal to perform a handover. Particularly, in accordance with the present invention, the message generator 318 generates a parameter representing prohibition of entry attempts to the base station for a predetermine time, such as an MAC management message including an entry limit timer TLV. For example, the entry limit timer TLV may be included in the ranging response message (e.g., RNG-RSP), the base station handover response message (e.g., MOB_BSHO-RSP), or the base station handover request message (e.g., MOB_BSHO-REQ) depending on entry attempt. The entry limit timer TLV may be configured as shown in Table 1.

When the MAC management message, the ranging response message (e.g., RNG-RSP), for example, the ranging response message (e.g., RNG-RSP) may include at least one of a parameter representing denial of entry (e.g., ranging status TLV), a parameter representing prohibited time period for entry (e.g., entry limit timer TLV), and a parameter indicating a different frequency (FA) (e.g., downlink frequency override TLV) through which an entry is recommended. When the MAC management message is the base station handover response message (e.g., MOB_BSHO-RSP) or the base station handover request message (e.g., MOB_BSHO-REQ), the base station handover response/request message (e.g., MOB_BSHO-RSP or MOB_BSHO-REQ) may include at least one of a parameter representing prohibited time period for entry (e.g., entry limit timer TLV) and a parameter identifying target base station candidate(s) that can accept a handover.

The encoder 320 channel-codes an information bit stream. The symbol modulator 322 modulates the channel-coded bit stream and converts the modulated bit stream into complex symbols. The subcarrier mapper 324 maps the complex symbols to a frequency domain. The OFDM modulator 326 converts the complex symbols mapped to the frequency domain into signals in a time domain through the inverse fast Fourier transform (IFFT) operation and inserts a CP to form an OFDM symbol. The RF transmitter 328 up-converts a baseband signal into an RF signal and transmits the RF signal through the antenna.

Figure 4:
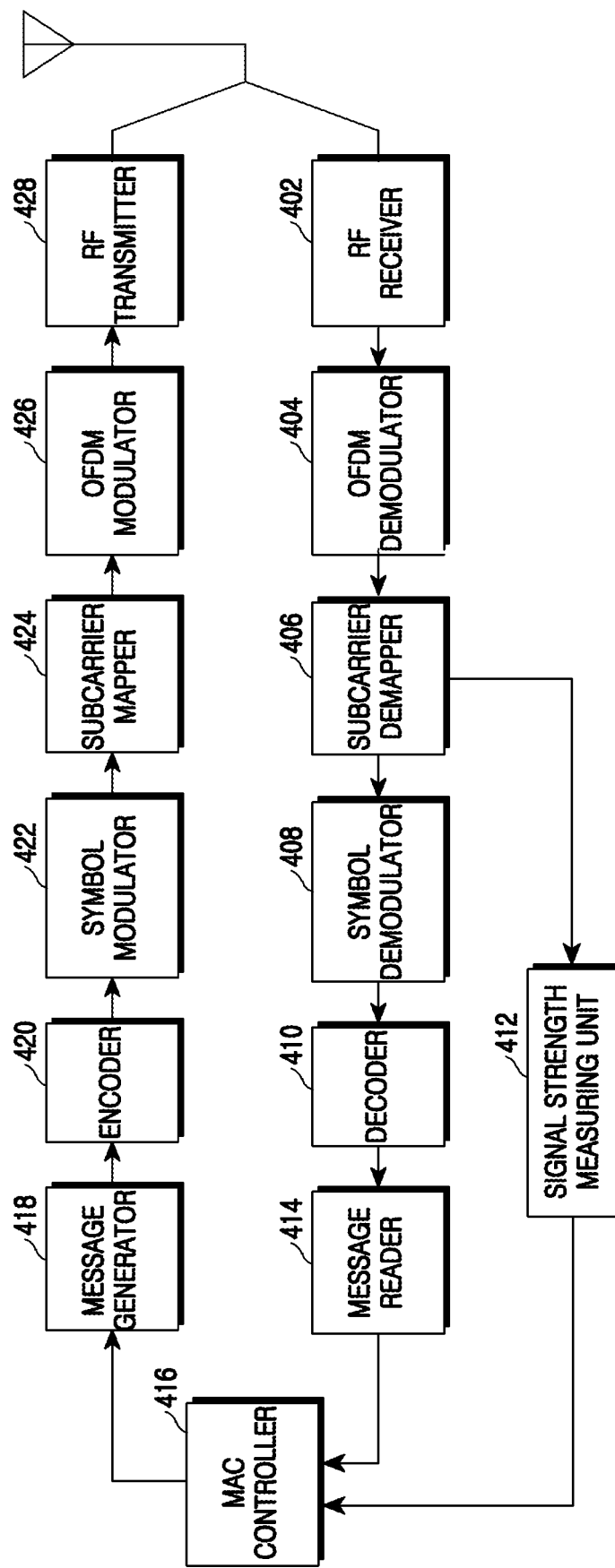
FIG. 4 is a block diagram illustrating a terminal in a broadband wireless communication system according to an exemplary embodiment of the present invention.

FIG. 4 illustrates a block diagram of a terminal in a broadband wireless communication system according to an exemplary embodiment of the present invention.

As shown in FIG. 4, the terminal includes an RF receiver 402, an OFDM demodulator 404, a subcarrier demapper 406, a symbol demodulator 408, a decoder 410, a signal strength measuring unit 412, a message reader 414, an MAC controller 416, a message generator 418, an encoder 420, a symbol modulator 422, a subcarrier mapper 424, an OFDM modulator 426, and an RF transmitter 428.

The RF receiver 402 down-converts an RF signal received through an antenna into a baseband signal. The OFDM demodulator 404 classifies a signal provided from the RF receiver 402 on an OFDM symbol basis, removes a CP, and restores complex symbols mapped to a frequency domain through the FFT operation. The subcarrier demapper 406 extracts complex symbols mapped to the frequency domain on a process basis. For example, while the terminal scans a base station for network entry or handover, the subcarrier demapper 406 extracts a signal for scanning, e.g., a preamble signal, and provides the preamble signal to the signal strength measuring unit 412. The symbol demodulator 408 demodulates complex symbols and converts the demodulated complex symbols into a bit stream. The decoder 410 restores an information bit stream by channel-decoding the bit stream.

The signal strength measuring unit 412 measures strength of a signal received from a base station. For example, the received signal strength can be expressed by received signal strength indication (RSSI), signal-to-noise ratio (SNR), signal-to-interface-and-noise ratio (SINR), carrier-to-interference-and-noise ratio (CINR), etc.

The message reader 414 reads an MAC management message received from a base station. For example, the message reader 414 confirms whether initial ranging is allowed by reading a ranging response message (e.g., RNG-RSP), which is a response to an initial ranging request, confirms a target base station that can accept a handover by reading a base station handover response message (e.g., MOB_BSHO-RSP), which is a response to a handover request, and confirms an acceptable target base station with respect to a handover by reading a base station handover request message (e.g., MOB-BSHO-REQ) to request the terminal to perform a handover. Particularly, in accordance with the present invention, the message reader 414 confirms a parameter representing prohibition of entry attempts to a base station for a predetermined time, that is, the entry limit timer TLV. In this case, entry (i.e., access to a base station) may be by initial ranging or handover. For example, the entry limit timer TLV may be included in the ranging response message (e.g., RNG-RSP), the base station handover response message (e.g., MOB_BSHO-RSP), or the base station handover request message (e.g., MOB_BSHO- REQ) depending on the entry attempt. The entry limit timer TLV may be configured as shown in Table 1.

The MAC controller 416 controls overall functions of the MAC layer of the terminal. For example, when the terminal tries initial ranging, the MAC controller 416 controls the terminal to generate and transmit a ranging request message (e.g., RNG-REQ). Also, when the terminal requests a handover, the MAC controller 416 controls the terminal to generate and transmit a handover request message (e.g., MOB_MSHO-REQ) including information of collected target base station candidates. The MAC controller 416 controls the terminal depending on allowance/denial status included in a ranging response message (e.g., RNG-RSP), which is a response to an initial ranging attempt. For example, in the case where an entry to a base station through initial ranging is rejected, the MAC controller 416 controls the terminal to scan for other base stations to enter the network. In the case of handover, the MAC controller 416 controls the operation of the terminal depending on information of target base station candidates that can accept a handover included in a base station handover response message (e.g., MOB_BSHO-RSP), which is a response to a handover request from the terminal. That is, the MAC controller 416 controls the terminal to select one of the target base station candidates that can accept a handover and transmit a handover indication message (e.g., MOB_HO-IND) to inform the selected target base station.

Particularly, in accordance with the present invention, when an entry limit timer TLV is detected in a received MAC management message, the MAC controller 416 prohibits entry attempts to the base station that has transmitted the MAC management message for a predetermined time designated by the entry limit timer TLV, that is, until the timer has expired. For example, in the case where the entry limit timer TLV is included in the ranging response message (e.g., RNG-RSP), the MAC controller 416 prohibits entry attempts to the base station that has transmitted the ranging response message (e.g., RNG-RSP) for a predetermined time. That is, when the base station that has transmitted the ranging response message is selected again as a result of scanning for base stations in order to enter a network, the MAC controller 416 controls the terminal to try initial ranging to one of the base stations other than the base station that has transmitted the ranging response message if the predetermined time has not expired. When the entry limit timer TLV is included in the base station handover response message (e.g., MOB_BSHO-RSP) or the base station handover request message (e.g., MOB_BSHO-REQ), the MAC controller 416 prohibits entry attempts, i.e., attempts for handover, to the base station that has transmitted the base station handover response/request message (e.g., MOB_BSHO-RSP or MOS_BSHO-REQ) for a predetermined time.

The message generator 418 generates an MAC management message transmitted to a base station. For example, the message generator 418 generates a handover request message (e.g., MOB_MSHO-REQ) to request a handover, a handover indication message (e.g., MOB_HO-IND) that includes information of a selected target base station for handover, and a ranging request message (e.g., RNG-REQ) to initiate initial ranging.

The encoder 420 channel-codes an information bit stream. The symbol modulator 422 modulates the channel-coded bit stream and converts the modulated bit stream into complex symbols. The subcarrier mapper 424 maps the complex symbols to a frequency domain. The OFDM modulator 426 converts the complex symbols mapped to the frequency domain into signals in a time domain through the IFFT operation, and inserts a CP to form an OFDM symbol. The RF transmitter 428 up-converts a baseband signal into an RF signal, and transmits the RF signal through the antenna.

Figure 5:
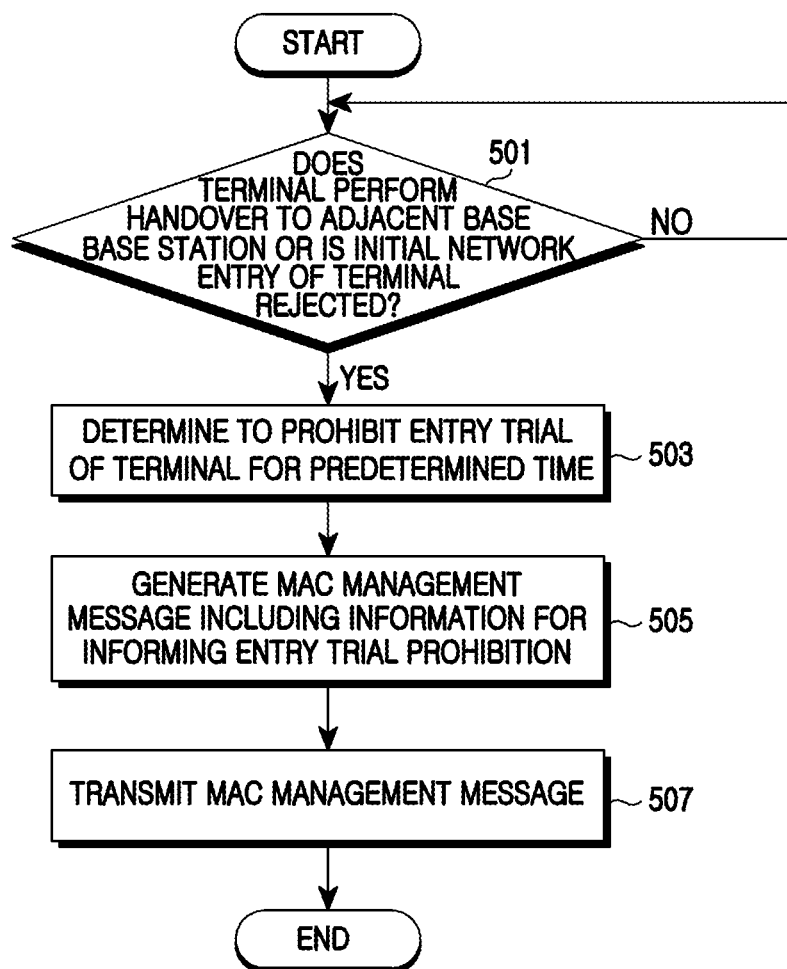
FIG. 5 is a view illustrating the operating procedure of a base station in a broadband wireless communication system according to an exemplary embodiment of the present invention.

FIG. 5 illustrates the operating procedure of a base station in a broadband wireless communication system according to an exemplary embodiment of the present invention.

As shown to FIG. 5, in step 501, the base station confirms whether a terminal performs handover to an adjacent base station, or whether an initial network entry of the terminal is rejected. Specifically, when the terminal performs the handover, the base station confirms whether at least one of target base station candidates can accept the handover of the terminal. Alternatively, when an entry request of the terminal through initial ranging occurs, the base station confirms whether entry is rejected because of resource shortage or service unavailable.

In step 503, once the terminal performs handover to an adjacent base station or the initial network entry of the terminal is rejected, the base station determines to prohibit the terminal from trying entry to the base station for a predetermined time. Here, entry (i.e., access to the base station) may be by initial ranging or handover. It is to be understood that the length of time for prohibition (i.e., the predetermined time) may vary depending on the specific instance without departing from the scope of the present invention.

In step 505, once it has been determined to prohibit the terminal from trying entry, the base station generates a parameter representing prohibition of entry attempts, that is, an MAC management message including an entry limit timer TLV. For example, the entry limit timer TLV may be included in the ranging response message (e.g., RNG-RSP), the base station handover response message (e.g., MOB_BSHO-RSP), or the base station handover request message (e.g., MOB_BSHO-REQ) depending on the attempted entry. The entry limit timer TLV may be configured as shown in Table 1.

When the MAC management message is the ranging response message (e.g., RNG-RSP), the ranging response message may include at least one of a parameter representing denial of entry (e.g., ranging status TLV), a parameter representing prohibited time period for entry (e.g., an entry limit timer TLV), and a parameter indicating a different frequency (FA) (e.g., downlink frequency override TLV) through which an entry is recommended. When the MAC management message is the base station handover response message (e.g., MOB_BSHO-RSP) or the base station handover request message (e.g., MOB_BSHO-REQ), the base station response/request message (e.g., MOB_BSHO-RSP or MOB_BSHO-REQ) may include at least one of a parameter representing prohibited time period for entry (e.g., entry limit timer TLV) and a parameter identifying target base station candidate(s) that can accept a handover.

In step 507, the base station transmits the MAC management message generated in step 505 to the appropriate terminal.

Figure 6:
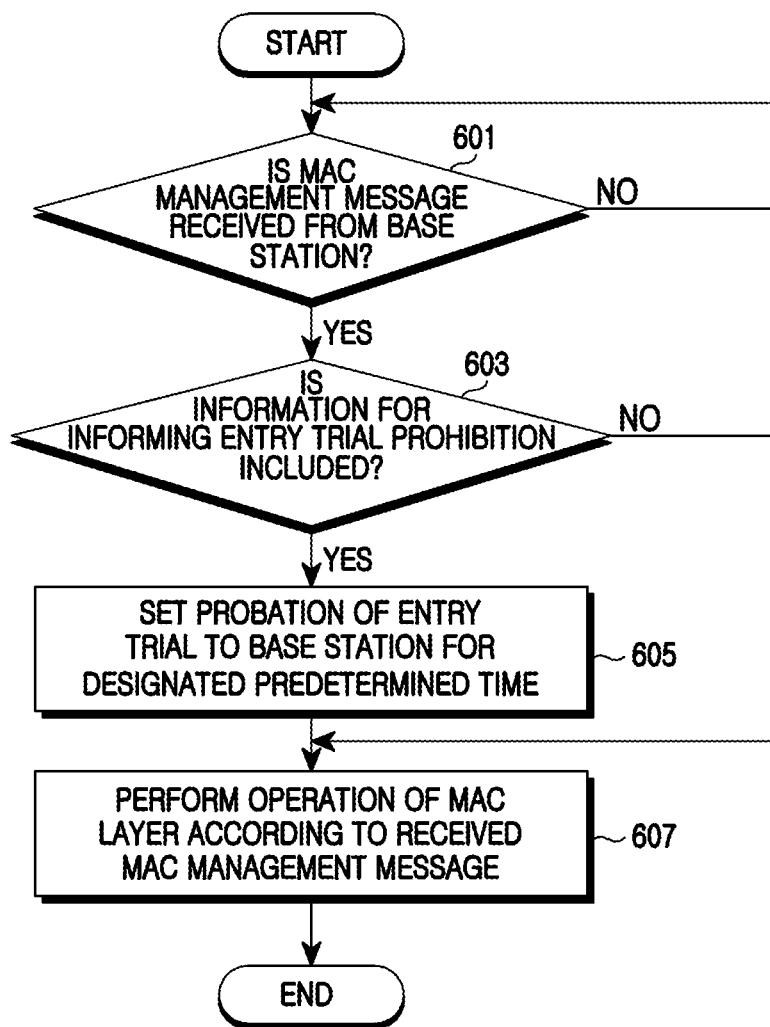
FIG. 6 is a view illustrating the operating procedure of a terminal in a broadband wireless communication system according to an exemplary embodiment of the present invention.

FIG. 6 illustrates the operating procedure of a terminal in a broadband wireless communication system according to an exemplary embodiment of the present invention.

As shown to FIG. 6, in step 601, the terminal confirms whether an MAC management message is received from a base station.

In step 603, when the MAC management message is received, the terminal confirms whether a parameter representing prohibition of entry attempts (i.e., an entry limit timer TLV) is included in the MAC management message by reading the MAC management message. Here, entry (i.e., access to a base station) may be by initial ranging or handover. For example, the entry limit timer TLV may be included in a ranging response message (e.g., RNG-RSP), a base station handover response message (e.g., MOB_BSHO-RSP), or a base station handover request message (e.g., MOB_BSHO-REQ) depending on the attempted entry. The entry limit timer TLV may be configured as shown in Table 1. That is, the terminal confirms the existence of entry limit timer TLV by reading the ranging response message (e.g., RNG-RSP), the base station handover response message (e.g., MOB_BSHO-RSP), and the base station handover request message (e.g., MOB_BSHO-REQ). If the entry limit timer TLV is not detected in the MAC management message, the terminal performs step 607 (described below).

When the entry limit timer TLV is detected, in step 605, the terminal sets prohibition of entry attempts to the base station that has transmitted the MAC management message for a predetermined time, that is, until expiration of a timer. Accordingly, the terminal does not try entry to the base station when the predetermined time has not expired even if the base station is selected as an optimum base station after scanning for network entry or for handover.

Subsequently, in step 607, the terminal performs MAC layer operation according to the received MAC management message. For example, when the MAC management message is a ranging response message (e.g., RNG-RSP) and ranging status TLV is set to "abort," the terminal scans for base stations to enter the network. Alternatively, when the MAC management message is a base station handover response/request message (e.g., MOB_BSHO-RSP or MOB_BSHO-REQ), the terminal selects a target base station to which handover is to be made and transmits information of the selected target base station to a serving base station.

Accordingly, unnecessary entry attempts and unnecessary execution of entry procedures by a terminal in a broadband wireless communication system are prevented due to prohibition of re-entry attempts using a parameter representing a time period prohibiting entry attempts when initial ranging is rejected or handover of the terminal.

Although the invention has been shown and described with reference to certain exemplary embodiments thereof, it will be understood by those skilled in the art that various changes in form and details may be made therein without departing from the spirit and scope of the invention as defined by the appended claims. Therefore, the scope of the present invention should not be limited to the above-described embodiments but should be determined by not only the appended claims but also the equivalents thereof.

What is claimed is:

1. A method performed by a terminal in a wireless communication system, the method comprising:
   transmitting, to a base station, a first access signal;
   receiving, from the base station, a response signal;
   identifying whether the response signal includes a value indicating a length of time;
   identifying an access failure based on the response signal; and
   transmitting, to the base station, a second access signal after a time that is determined based on the value,
   wherein the first access signal is selected based on a first code among a plurality of predefined codes, and
   wherein the second access signal is selected based on a second code among the plurality of predefined codes.

2. The method of claim 1, wherein the value is associated with a resource shortage of the base station.

3. The method of claim 1,
   wherein the value indicates one value identified from a plurality of candidate values, and
   wherein the plurality of the candidate values has a uniform distribution between a maximum value and a minimum value.

4. The method of claim 1,
   wherein the time is determined based on a predetermined relationship between the value indicating the length of time and one of a plurality of time periods, and
   wherein the value indicating the length of time indicates one value identified from a plurality of candidate values including 0.

5. The method of claim 1, wherein the value indicating the length of time indicates a time period during which access of the base station by the terminal is prohibited.

6. A terminal in a wireless communication system, the terminal comprising:
   a transceiver; and
   at least one processor operably coupled to the transceiver, wherein the at least one processor is configured to:
     transmit, to a base station, a first access signal,
     receive, from the base station, a response signal,
     identify whether the response signal includes a value indicating a length of time,
     identify an access failure based on the response signal, and
     transmit, to the base station, a second access signal after a time that is determined based on the value,
   wherein the first access signal is selected based on a first code among a plurality of predefined codes, and
   wherein the second access signal is selected based on a second code among the plurality of predefined codes.

7. The terminal of claim 6, wherein the value is associated with a resource shortage of the base station.

8. The terminal of claim 6,
   wherein the value indicates one value identified from a plurality of candidate values, and
   wherein the plurality of the candidate values has a uniform distribution between a maximum value and a minimum value.

9. The terminal of claim 6,
   wherein the time is determined based on a predetermined relationship between the value indicating the length of time and one of a plurality of time periods, and
   wherein the value indicating the length of time indicates one value identified from a plurality of candidate values including 0.

10. The terminal of claim 6, wherein the value indicating the length of time indicates a time period during which access of the base station by the terminal is prohibited.

11. A method performed by a base station in a wireless communication system, the method comprising:
    receiving, from a terminal, a first access signal;
    transmitting, to the terminal, a response signal including a value indicating a length of time; and
    receiving, from the terminal, a second access signal after a time,
    wherein the value is used to determine the time,
    wherein the first access signal is selected based on a first code among a plurality of predefined codes, and
    wherein the second access signal is selected based on a second code among the plurality of predefined codes.

12. The method of claim 11, wherein the value is associated with a resource shortage of the base station.

13. The method of claim 11,
wherein the value indicates one value identified from a plurality of candidate values, and
wherein the plurality of the candidate values has a uniform distribution between a maximum value and a minimum value.

14. The method of claim 11,
wherein the time is determined based on a predetermined relationship between the value indicating the length of time and one of a plurality of time periods, and
wherein the value indicating the length of time indicates one value identified from a plurality of candidate values including 0.

15. The method of claim 11, wherein the value indicating the length of time indicates a time period during which access of the base station by the terminal is prohibited.

16. A base station in a wireless communication system, the base station comprising:
a transceiver; and
at least one processor operably coupled to the transceiver, wherein the at least one processor is configured to:
receive, from a terminal, a first access signal,
transmit, to the terminal, a response signal including a value indicating a length of time, and
receive, from the terminal, a second access signal after a time,
wherein the value is used to determine the time,
wherein the first access signal is selected based on a first code among a plurality of predefined codes, and
wherein the second access signal is selected based on a second code among the plurality of predefined codes.

17. The base station of claim 16, wherein the value is associated with a resource shortage of the base station.

18. The base station of claim 16,
wherein the value indicates one value identified from a plurality of candidate values, and
wherein the plurality of the candidate values has a uniform distribution between a maximum value and a minimum value.

19. The base station of claim 16,
wherein the time is determined based on a predetermined relationship between the value indicating the length of time and one of a plurality of time periods,
wherein the value indicating the length of time indicates one value identified from a plurality of candidate values including 0.

20. The base station of claim 16, wherein the value indicating the length of time indicates a time period during which access of the base station by the terminal is prohibited.

* * * * *